(12) United States Patent
Krishnamoorthi

(10) Patent No.: US 7,714,863 B2
(45) Date of Patent: May 11, 2010

(54) MULTIDIMENSIONAL VISUALIZATION OF INFORMATION AND MESSAGES IN A MESSAGING SYSTEM

(75) Inventor: Vijaysaravanan Krishnamoorthi, Alsdorf (DE)

(73) Assignee: Cycos Aktiengesellschaft, Alsdorf (DE)

( * ) Notice: Subject to any disclaimer, the term of this patent is extended or adjusted under 35 U.S.C. 154(b) by 341 days.

(21) Appl. No.: 11/429,122

(22) Filed: May 5, 2006

(65) Prior Publication Data

US 2007/0257916 A1 Nov. 8, 2007

(51) Int. Cl.
G06T 11/20 (2006.01)
G09G 5/00 (2006.01)
G06F 3/00 (2006.01)

(52) U.S. Cl. .................. 345/440; 345/661; 715/700; 715/748; 715/751

(58) Field of Classification Search ............... 345/440, 345/661; 715/700, 748, 751
See application file for complete search history.

(56) References Cited

U.S. PATENT DOCUMENTS

| | | | |
|---|---|---|---|
| 2003/0030670 A1* | 2/2003 | Duarte et al. | 345/758 |
| 2004/0125150 A1* | 7/2004 | Adcock et al. | 345/810 |
| 2005/0052458 A1* | 3/2005 | Lambert | 345/440 |
| 2005/0057584 A1* | 3/2005 | Gruen et al. | 345/752 |
| 2007/0143236 A1* | 6/2007 | Huelsbergen et al. | 706/20 |
| 2008/0014982 A1* | 1/2008 | Foxenland | 455/550.1 |

* cited by examiner

Primary Examiner—Xiao M Wu
Assistant Examiner—Tize Ma

(57) ABSTRACT

The invention relates to a method and a computer program for displaying a plurality of electronic messages in a message system with the electronic messages being called up from one or more directories for electronic messages. In this case, a multidimensional diagram is first of all created on a graphics user interface, after which the electronic messages are converted to graphics symbols, and the graphics symbols are finally displayed on the multidimensional diagram on the basis of at least one characteristic of the respective electronic message.

17 Claims, 2 Drawing Sheets

MULTIDIMENSIONAL VISUALIZATION OF INFORMATION AND MESSAGES IN A MESSAGING SYSTEM

FIELD OF THE INVENTION

The invention relates to a method of visualizing information and messages in a messaging system.

BACKGROUND OF THE INVENTION

Nowadays, electronic messages are an elementary means for private and business communication. Users of electronic communication means receive and transmit a large number of electronic messages every day, which they create, transmit, receive, store and manage by means of a communication program, for example by means of an e-mail program such as Microsoft Outlook. When a so-called unified messaging system, or messaging system, is used for communication, not only are the known e-mail messages managed in this way, but also fax messages, voicemails, telephone contacts, etc. The various messages are generally managed with the aid of various files or directories, so-called mail folders, with different categories such as "incoming messages", "outgoing messages", "drafts", etc. normally being used. Within the various categories, the messages can be displayed by means of a list which, for example may be sorted chronologically or on the basis of people (contacts).

SUMMARY OF THE INVENTION

In known message systems, it has been found to be disadvantageous that, particularly when there are a large number of messages to be managed, the overview is quickly lost. Messages can admittedly be found with the aid of filters and search machines, but the number of electronic messages which can be displayed simultaneously is restricted, even when filtering is used. As a result of this, one object of the present invention is thus to improve the display of electronic messages.

This object is achieved by the claims. Advantageous refinements are specified in the dependent claims, in which case the features of a plurality of dependent patent claims can also advantageously be combined with one another.

It is proposed that the messages in a message system be displayed with the aid of symbols on a multidimensional diagram. For this purpose, a symbol is created for each electronic message and is placed at an appropriate point in the multidimensional diagram. The point is determined on the basis of at least one characteristic of the electronic message.

In one possible embodiment of the invention, this multidimensional diagram is a two-dimensional time/date diagram, in which the symbols for the received message are arranged at the appropriate point for the time of reception, and the symbols for the transmitted message are arranged in a corresponding manner at that point which represents the transmission date and the transmission time.

Alternatively, the transmission time and the reception time can also be used for one of the axes, while the file size or the importance or some other feature of electronic messages can be used for a second axis. A projection view is possible for three-dimensional diagrams; furthermore, the displayed symbols can change dynamically, for example by a blinking display for unread messages.

In another embodiment, the symbols for electronic messages may have a particular configuration element or may be equipped with additional symbols so that it is possible to tell at a glance whether this is a transmitted message or received message, who the sender or recipient of the message is or was, and whether this was a relayed message or a response message, etc. This is particularly advantageous when the electronic messages in a plurality of categories are displayed at the same time on one diagram, for example transmitted and received e-mails.

In a further embodiment, it is possible to use a mouse cursor or a similar control element to call up further information, for example by placing the mouse cursor on or over a symbol. In this case, a so-called "tool tip" can be used to temporarily indicate a small window with further information.

It is particularly expedient if the corresponding electronic message can be opened by means of a so-called "double click" on the symbol of this message. Furthermore, it is possible to open a so-called context menu by "clicking on" a symbol with the right-hand mouse button, by which means different options are offered, such as "respond to this message" or "print".

Electronic messages are always linked to a recipient or a sender; recipients and senders, generally people or addresses, are in this case referred to as a "contact". It is advantageous to use an association capability, for example of an editor, to associate the contacts with different symbolic displays ("icons"), pictures or photographs. This is advantageously used for the graphics symbols on the multidimensional diagram, thus improving the clarity and making it easier to search for specific messages.

A plurality of electronic messages are frequently related to one another. For example, transmitted messages are often a response to a previously received message. References such as these can be visualized graphically in order to improve the clarity, for example by lines or arrows.

BRIEF DESCRIPTION OF THE DRAWINGS

Features and advantages of the present invention will be explained in more detail in the following text with reference to the drawing, in which.

DETAILED DESCRIPTION OF THE INVENTION

A user uses commercially available software, in this exemplary embodiment the Outlook program from the Microsoft company, to access his electronic messages. This program uses a so-called "explorer" view to produce various files/directories ("folders"), in which the electronic messages are each displayed in the form of a list. A graphics user interface is used for this purpose and is controlled using a conventional pointer device (mouse).

The following text describes the use of a computer program which allows the electronic messages to be displayed according to the invention. In the present exemplary embodiment, the computer program is in the form of a so-called software plug-in, that is to say additional software which adds additional functions and additional control elements to the existing communication program (in this case "Microsoft Outlook"). The computer programs mentioned may, of course, also be in the form of a so-called "stand-alone" solution, and may itself access a memory device with electronic messages (in this case: Microsoft Exchange Server).

In order to actuate the graphics display of various (a plurality of) electronic messages, the user first of all marks those directories whose contents he wishes to display graphically. Alternatively, a selection of individual messages can also be marked. The process of "marking" is in this case a standard function in the operating system that is used (in this case: Microsoft Windows), and will therefore not be explained any further at this point. After marking the corresponding directories, the user now activates an appropriate button using the mouse, in order to cause the electronic messages to be displayed on a multidimensional diagram. The user also has access to a "characteristic function" of course, by means of which it is possible to change the presets which decide on the form and the scope of the graphics display.

In the present exemplary embodiment, the presets are intended to allow a two-dimensional diagram to be output, with the date being plotted on the X axis (abscissa), and the time of the corresponding electronic message being plotted on the Y axis (ordinate).

Figure 1:
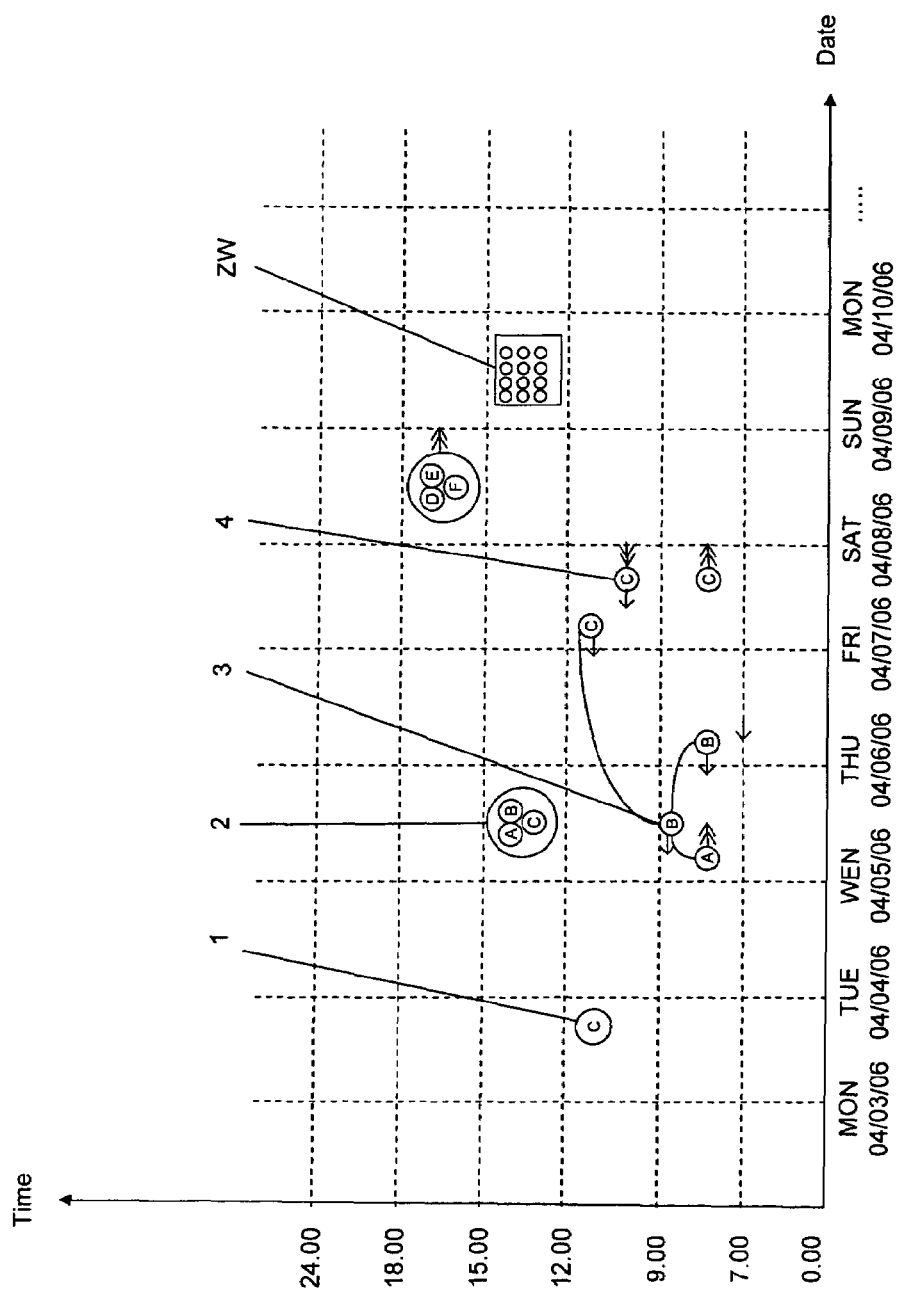
FIG. 1 shows the graphics visualization of a mailbox for electronic messages.

One example of a two-dimensional diagram display such as this is illustrated schematically in FIG. 1. The corresponding legend relating to this display is shown in FIG. 2, in which case the legend may also be displayed in the same screen window as the diagram output, or in which case, alternatively, the outputting of the legend can also be entirely suppressed.

Both an in-mail file and an out-mail file have been selected to be jointly displayed on the diagram output in the present exemplary embodiment, so that both incoming (received) electronic messages as well as outgoing (transmitted) electronic messages are shown in FIG. 1. It should be noted that the view shown here is only an example of a display, which may be modified on a user-defined basis depending on the configuration of the computer program. In particular, in reality, it is also possible to output photographs and colored symbols as well as blinking symbols or symbols animated in some other way, for example in order to emphasize unread messages.

The computer program for access to the electronic messages (in this case: Microsoft Outlook) also has an address directory and access to a central address directory ("directory service"). User names are linked in the normal manner to communication addresses (in this case: e-mail addresses) in an address directory such as this. However, address directories also make it possible to associate the entries (contacts) shown there with any desired other information. For example, it is also possible to associate a separate image, symbol or another graphics output with each of the contacts. This can also be achieved by insertion of a so-called link. In this case, the image/symbol is stored in any desired external device.

Figure 2:
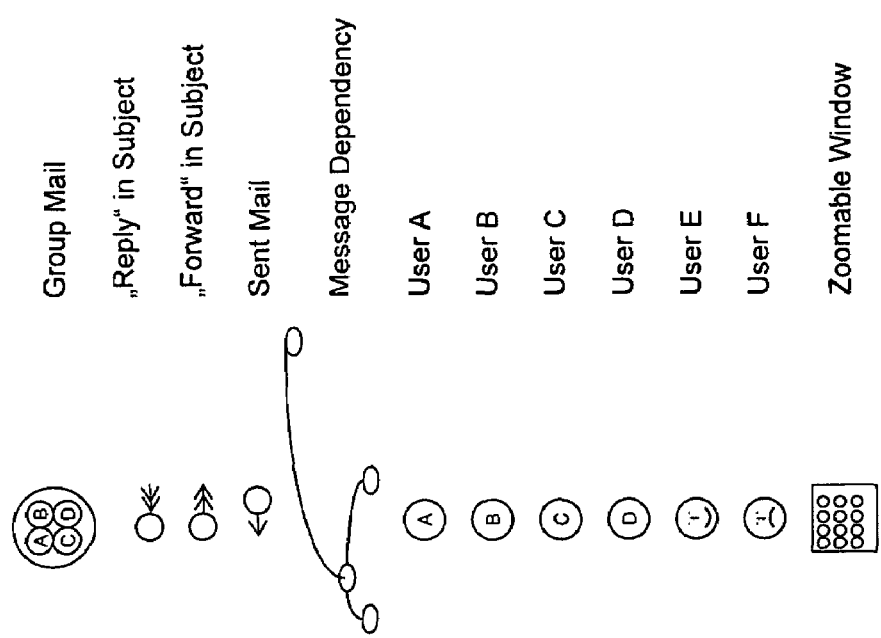
FIG. 2 shows the legend relating to the symbols used in FIG. 1.

Circles with letters A, B, C, D, E, F are shown as graphics symbols in FIGS. 1 and 2; however, the described computer program can also be used, of course, to display all of the possible types of symbols described above. In this case, mention should once again be made expressly of the capability to use photographs of the people linked to the respective contacts, company logos, clip-art graphics, and of course "icons" or the like.

FIG. 1 shows a first graphics symbol 1. No additional symbol is associated with the graphics symbol, in this case the letter C with a circle. On the basis of the computer program presets, this means that this is a received e-mail message. Some of the optionally possible additional symbols are illustrated in FIG. 2; further possible additional symbols would, for example, include a letter symbol for e-mail messages, a sheet of paper symbol for fax messages, a loudspeaker symbol for voice-mail messages, or the like.

The symbol 2 which is shown in the figure represents a received electronic message which is linked to a plurality of contacts A, B, C. Messages such as these are referred to as "group mail". While a symbol for the sender of this message is used, for the received electronic message with reference symbol 1 (letter C), a group of symbols A, B, C has been used for the "group mail", in which case both the sender and the further recipients, that is to say all the recipients apart from the user of this display himself, are indicated as a symbol. In this case, the sender can be identified in particular in order to distinguish him from the other recipients, for example, by the symbol that is shown in the first, uppermost location being used for the sender. The sender may, of course, also be identified in a different manner.

The relationship between individual electronic messages can be visualized by a different group of symbols 3. In this case, individual symbols A, B, C which represent individual electronic messages can be linked to one another or referred to one another by means of lines or by means of other graphics elements. Alternatively, this can also be visualized, for example, by means of an identical coloring, by means of additional symbols or by "blinking" in the same rhythm. In the case of the group of symbols 3, the "oldest" displayed electronic message is linked to the contact A; the displayed electronic message contains the note "forward" in the reference line, thus expressing the fact that this message is an electronic message which has already been forwarded by the contact (person) A. It is also evident from the symbol 3 that a message which was sent to the contact B was produced a short time later from this received message; further transmitted electronic messages were also produced from this transmitted electronic message the next day and on the day after that, specifically once again to the recipient B and to the recipient C. In the present exemplary embodiment, such relationships are registered by the computer program when creating an electronic message that is to be transmitted. If, for example, a received electronic message is opened and the basic structure of a new electronic message is created using one of the known functions "forward", "reply" or "reply to all", this relationship is registered. In situations in which no such registration has taken place, the computer program can compare the reference lines or can compare the contents, provided that they are at least partially identical, in order to determine the probability of the dated items being actually technically related, technically independent of one another, with electronic messages. A threshold value can be defined for the display, which must be exceeded when two or more electronic messages which are probably associated with one another are intended to be identified as being associated in the manner described by means of the symbol 3.

The symbol 4 is an example of a message which, admittedly has the indicator "reply" in its "subject" reference line, that is to say it is apparently a reply message, and which was transmitted by the user of the system. No corresponding message relating to this, that is to say the originally received electronic message used as the basis for the electronic message being transmitted here is, however, present in the marked directories, so that the symbol 4 is not linked to any other symbol.

The symbol ZW represents a "zoomable window", a symbol such as this is entered at those points on the two-dimensional diagram at which a large number of symbols would need to be displayed close to one another. However, since symbols which are placed close to one another cannot be distinguished from one another, or can be distinguished from one another only with difficulty, the symbol ZW indicates that there is a high "message density" here. However, this symbol is resolved by means of a double click with a mouse cursor or some similar control procedure, which then results in an enlarged display with correspondingly scaled axes. The window that has been widened in this way can also be reduced in size again by means of another control procedure. Provided that the mouse cursor has been placed over the symbol ZW, an additional display can be produced temporarily by means of a "tool tip" window, for example with the contents indicating that the symbol ZW relates to twelve messages of the users A, B and D, with a total of 18 file attachments and a total volume of 5.8 MB. Similar "tool tip" windows can also be produced for the other symbols 1, 2, 3, 4; in these cases, by way of example, the full name of the respective contact, the reference line of the electronic message and the start of the text body of the electronic message can be visualized in the form of a "preview window" in this additional window.

The computer program settings can be used to define what action shall take place when the user of one of the symbols 1, 2, 3, 4, ZW clicks on it with a "double click" or clicks on it with the right-hand mouse button. In the case of a "double click" the individual electronic messages are opened in the normal manner, while the symbol ZW is extended to form a complete display. Clicking with the right-hand mouse button produces a context menu which offers various options, with the standard setting. These generally include "open the message" and of course "print", "forward", "reply", or the like. In this case, it is sensible to block the "reply" function for transmitted messages.

What is claimed is:

1. A method of displaying a plurality of electronic messages in a computerized message system, comprising:
    retrieving the electronic messages from at least one electronic message directory, wherein the electronic messages comprise distinct modalities of electronic communication, wherein the plurality of electronic messages contains technically related and technically unrelated messages;
    generating a multidimensional diagram on a graphics user interface;
    converting the electronic messages into graphics symbols, wherein messages associated with different contacts are represented by graphics symbols configured to uniquely identify the different contacts, and further wherein messages associated with the distinct modalities of electronic communication are represented by graphics symbols configured to uniquely identify the distinct modalities of electronic communication; and
    arranging each graphics symbol in the multidimensional diagram based on at least one attribute of the respective electronic message, wherein a display position of the respective graphics symbol in the multidimensional diagram is determined from the attribute;
    defining a threshold value indicative of a probabilistic value of technical relationship between at least two of the messages; and
    graphically connecting the graphics symbols corresponding to said at least two of the electronic messages to indicate the technical relationship between said at least two messages when the threshold value is exceeded, thereby allowing a user to graphically search for technically retated messages in the plurality of electronic messages containing technically related and technically unrelated messages, wherein each of the preceding steps of retrieving, generating, converting, arranging, defining and graphically connecting is performed by a computer coupled to the message system.

2. The method as claimed in claim 1, wherein the multidimensional diagram is a two-dimensional diagram having:
    a first axis used for representing a date of the messages; and
    a second axis used for representing a time of the messages, wherein the display position of each graphics symbol is determined from the date and the time of the respective message.

3. The method as claimed in claim 1, wherein at least one of the messages has a further symbol allocated to the graphics symbol of the respective message, the method further comprising displaying the further symbol and the graphics symbol at the display position.

4. The method as claimed in claim 3, wherein the further symbol indicates whether the respective message has been sent or received.

5. The method as claimed in claim 1, wherein at least one message is associated with a plurality of contacts, the method further comprising:
    converting the at least one message into a group of symbols, the group having a plurality of individual symbols each corresponding to one of the plurality of contacts; and
    displaying the group in the multidimensional diagram.

6. The method as claimed in claim 1, wherein graphically connecting the graphics symbols includes drawing a line between the graphics symbols or displaying an arrow pointing from one of the graphics symbols to at least one other of the graphics symbols.

7. The method as claimed in claim 1, wherein the attribute is a time of the messages, the method further comprising:
    converting a plurality of messages having essentially the same time into a time group symbol; and
    expanding the time group symbol into a plurality of individual graphics symbols upon a user request.

8. The method as claimed in claim 1, further comprising opening at least one of the messages by positioning a mouse cursor on the respective graphics symbol and activating the mouse cursor.

9. The method as claimed in claim 1, wherein the graphics symbols include icons or photographs representing people associated with the messages.

10. An article of manufacturing comprising a computer readable medium for storing a computer program for accessing a plurality of electronic messages in a computerized message system, the computer program when executed by a computer coupled to the message system configured to:
    access at least one database having stored electronic messages, wherein the electronic messages comprise distinct modalities of electronic communication, wherein the plurality of electronic messages contains technically related and technically unrelated messages;
    simultaneously display a plurality of electronic messages by a graphics user interface;
    arrange the user interface as a multidimensional diagram;
    visualize the electronic messages as graphics symbols, wherein electronics messages associated with different contacts are represented by graphics symbols configured to uniquely identify the different contacts, and further wherein messages associated with the distinct modalities of electronic communication are represented by graphics symbols configured to uniquely identify the distinct modalities of electronic communication;
    position each graphics symbol in the multidimensional diagram based on at least one attribute of the respective electronic message;

define a threshold value indicative of a probabilistic value of a technical relationship between at least two of the messages; and graphically connect the graphics symbols corresponding to said at least two of the electronic messages to indicate the technical relationship between said at least two messages when the threshold value is exceeded thereby allowing a user to graphically search for related messages in the plurality of electronic messages containing technically related and technically unrelated messages.

11. The computer readable medium as claimed in claim 10, wherein the multidimensional diagram is a two-dimensional diagram having a first axis representing a time information of the messages.

12. The computer readable medium as claimed in claim 11, wherein the time information includes a time or a date of the messages.

13. The computer readable medium as claimed in claim 11, wherein the two-dimensional diagram has a second axis representing a status of the messages.

14. The computer readable medium as claimed in claim 13, wherein the status is a size or an importance of the respective message.

15. The computer readable medium as claimed in claim 10, wherein the attribute is a time of the messages, and the computer program is further configured to group the symbols of such electronic messages having essentially the same time.

16. The computer readable medium as claimed in claim 10, wherein the attribute is a subject of the messages, and the computer program is further configured to group the symbols of such electronic messages having essentially the same subject.

17. The computer readable medium as claimed in claim 10, wherein the computer program includes an editor for assigning different graphics symbols to different contacts included in an address directory, and the computer program is further configured to display the assigned graphics symbols for representing such messages having contacts included in the address directory.

* * * * *